(12) United States Patent
Yeh

(10) Patent No.: US 11,733,747 B2
(45) Date of Patent: Aug. 22, 2023

(54) MULTI-BATTERY SUPPORT FOR WEARABLES

(71) Applicant: Google LLC, Mountain View, CA (US)

(72) Inventor: Chia Hang Yeh, Campbell, CA (US)

(73) Assignee: Google LLC, Mountain View, CA (US)

( * ) Notice: Subject to any disclaimer, the term of this patent is extended or adjusted under 35 U.S.C. 154(b) by 293 days.

(21) Appl. No.: 16/869,005

(22) Filed: May 7, 2020

(65) Prior Publication Data

US 2021/0349505 A1 Nov. 11, 2021

(51) Int. Cl.
*H02J 50/40* (2016.01)
*G06F 1/18* (2006.01)
*G06F 1/16* (2006.01)
*H02J 7/00* (2006.01)

(52) U.S. Cl.
CPC .............. *G06F 1/189* (2013.01); *G06F 1/163* (2013.01); *H02J 7/0031* (2013.01); *H02J 7/00034* (2020.01); *H02J 7/00304* (2020.01); *H02J 7/00308* (2020.01); *H02J 50/40* (2016.02); *H02J 2310/22* (2020.01)

(58) Field of Classification Search
CPC ........ H02J 7/0014; H02J 7/0048; H02J 7/007; H02J 7/0013; H02J 7/00032; H02J 7/0029; H02J 7/0047; H02J 7/0063; H02J 7/00712; H02J 7/005; H02J 7/00; H02J 7/0049; H02J 1/001; H02J 2310/48; H02J 7/0019; H02J 7/0031; H02J 7/00036; H02J 7/0016; H02J 7/00302; H02J 7/00304; H02J 7/00308; H02J 7/1423; H02J 7/24; H02J 2207/20; H02J 7/00045; H02J 7/0042; H02J 7/0068; H02J 7/00718; H02J 7/007194; H02J 9/061; H02J 2207/40; H02J 2310/22; H02J 3/32; H02J 50/10; H02J 50/40; H02J 7/00034; H02J 7/0025; H02J 7/00309; H02J 7/007182; H02J 7/007192; H02J 7/02; H02J 7/14; H02J 7/342; H01M 10/441; H01M 10/482; H01M 2010/4271; H01M 10/4257; H01M 10/4207; H02H 1/0015; H02H 3/085
USPC .................................................. 320/106–115
See application file for complete search history.

(56) References Cited

U.S. PATENT DOCUMENTS

| | | |
|---|---|---|
| 2009/0278497 A1 | 11/2009 | Kim |
| 2013/0082662 A1* | 4/2013 | Carre .................. H02J 7/00 320/134 |
| 2013/0187614 A1 | 7/2013 | Bhardwaj |
| 2014/0176043 A1* | 6/2014 | Fujiyama ............ H02J 7/00 320/101 |
| 2016/0359345 A1* | 12/2016 | Uesugi ............ H02J 7/00047 |
| 2017/0098943 A1* | 4/2017 | Kubota ............... H02H 7/18 |
| 2017/0331304 A1* | 11/2017 | Arendell ............. H02J 7/007 |
| 2018/0013299 A1* | 1/2018 | Abe .................... H02J 7/0029 |

(Continued)

*Primary Examiner* — Binh C Tat
(74) *Attorney, Agent, or Firm* — Lerner David LLP

(57) ABSTRACT

The technology relates generally to a distributed battery cell charging circuit that allows for battery cells to be positioned in different locations. The distributed battery charging circuit may include a first charging circuit including at least one battery cell, a second charging circuit including at least one battery cell, and a controller configured to control the charging of the at least one battery cell in the first charging circuit independently of controlling the charging of the at least one battery cell in the second charging circuit.

20 Claims, 4 Drawing Sheets

(56) References Cited

U.S. PATENT DOCUMENTS

2019/0020074 A1\* 1/2019 Motoichi ............ H02J 7/00302
2019/0115769 A1\* 4/2019 Chen ..................... H02J 7/0068
2019/0372376 A1\* 12/2019 Kwak ....................... H02J 7/00

\* cited by examiner

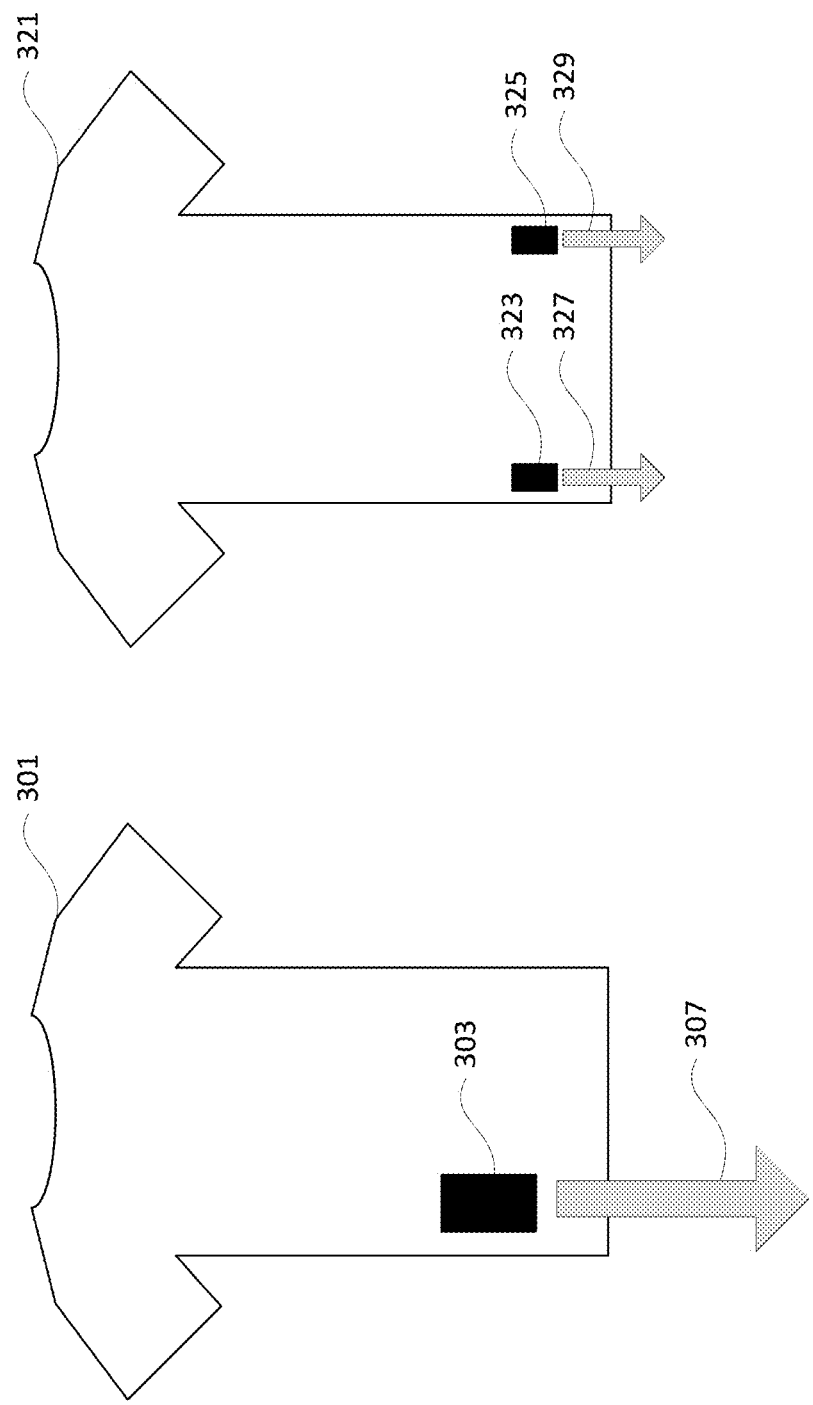

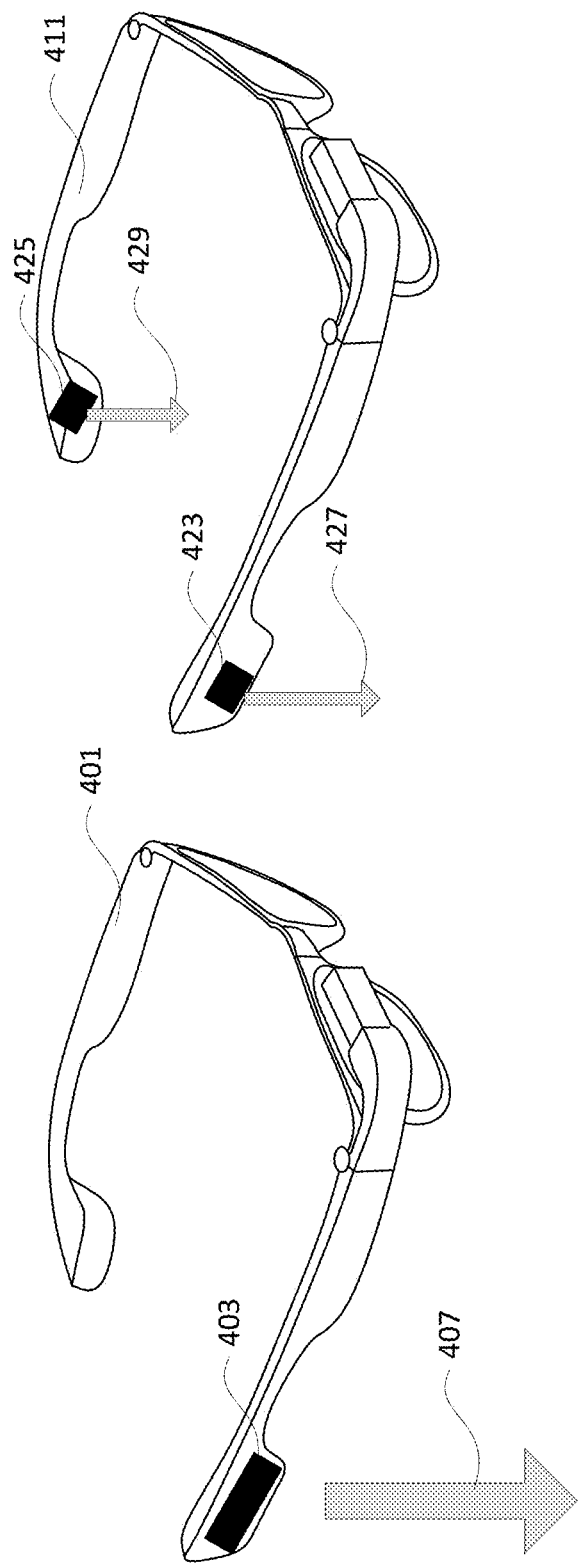

MULTI-BATTERY SUPPORT FOR WEARABLES

BACKGROUND

Wearable devices are electronic devices that are designed to be worn by users. Users may wear wearable devices for extended periods of times. Batteries having sufficient capacity to provide power for hours or days are typically used in wearable devices to maximize the time before a user needs to recharge a device's batteries. The capacity of a battery is usually commensurate with the size of the battery, with batteries having more capacity being larger and heavier than batteries with less capacity.

Integrating a battery capable of providing sufficient battery life into a wearable device often requires tradeoffs with other aspects of the wearable device, including the shape, size, weight, and weight distribution of the wearable device. Larger batteries generally need more space within or on a wearable device, and as such, the size and shape of the wearable device has to be designed around the dimensions of the battery. Moreover, larger batteries may add weight to the wearable device, which may cause an uneven weight distribution of the wearable device. The larger size, heavier weight, and/or uneven weight distribution of a wearable device may cause discomfort to a user of the wearable device.

SUMMARY

Aspects of the disclosure are directed to a distributed battery cell charging circuit. In one aspect the distributed battery cell charging circuit may include a first charging circuit including at least one battery cell; a second charging circuit including at least one battery cell; and a controller configured to control the charging of the at least one battery cell in the first charging circuit independently of controlling the charging of the at least one battery cell in the second charging circuit.

In some instances, the distributed battery cell charging circuit may include a first power switch in the first charging circuit; and a second power switch in the second charging circuit. In some instances the controller is connected to the first power switch via a first charge control line and the second power switch via a second charge control line. In some examples, the controller controls the charging of the at least one battery cell in the first charging circuit by sending one or more control signals to the first power switch via the first charge control line, the one or more control signals configured to cause the first power switch to open or close the first charging circuit.

In some instances, the distributed battery cell charging circuit includes a charger connected to the first charging circuit via the first power switch and the second charging circuit via the second power switch. In some examples, when the one or more control signals cause the first power switch to close, the charger delivers power to the at least one battery cell in the first charging circuit. In some examples, when the one or more control signals cause the first power switch to open, the charger ceases to deliver power to the at least one battery cell in the first charging circuit.

In some instances, the distributed battery cell charging circuit includes a first cell protection circuit connected to the at least one battery cell in the first charging circuit; and a gas gauge connected to the first cell protection circuit and the at least one battery cell in the first charging circuit. In some examples, the first cell protection circuit monitors operating parameters of the at least one battery cell in the first charging circuit including the voltage and current at the at least one battery cell in the first charging circuit. In some examples, the first cell protection circuit opens the first charging circuit upon detecting voltage over a first threshold value, a voltage below a second threshold value, or a current over a third threshold value to prevent power delivery to the at least one battery cell in the first charging circuit.

In some instances, the gas gauge is configured to determine a capacity of the at least one battery cell in the first charging circuit based on a temperature of the at least one battery cell in the first charging circuit. In some examples, the gas gauge is configured to receive the operating parameters from the first cell protection circuit. In some examples, the gas gauge is connected to the controller via a data bus, and the gas gauge is further configured to transmit at least one of the temperature, capacity, and operating parameters of the at least one battery cell in the first charging circuit to the controller via the data bus.

In some examples, the controller is configured to determine whether the capacity of the at least one battery cell in the first charging circuit is below a threshold value. In some instances, the controller is configured to send an instruction to the first charging circuit to begin charging upon determining the capacity of the least one battery cell in the first charging circuit is below the threshold value.

In some instances, at least one of the first charging circuit and second charging circuit are removable from the distributed battery cell charging circuit.

In some instances, the first charging circuit includes one battery cell and the second charging circuit includes at least two battery cells.

In some instances, the first charging circuit includes a resistor to increase the impedance of the first charging circuit. In some examples, the impedance of the first and second charging circuits are the same.

In some instances, the distributed battery cell charging circuit includes a third charging circuit.

BRIEF DESCRIPTION OF THE DRAWINGS

FIG. 3 shows an example implementation of a distributed battery cell charging circuit in accordance with aspects of the disclosure.

FIG. 4 shows an example implementation of a distributed battery cell charging circuit in accordance with aspects of the disclosure.

DETAILED DESCRIPTION

Overview

The technology relates generally to a distributed battery cell charging circuit that allows for battery cells to be positioned in different locations. In this regard, individual battery cells may be positioned remotely from the other battery cells in a device, such as a wearable device. Each individual battery cell may have a dedicated charge control circuit, including a cell protection circuit and a gas gauge. A centralized controller may monitor and communicate with each dedicated charge control circuit to independently control the charging of each respective battery cell. A centralized charger may provide power to each dedicated charge control circuit for charging the individual battery cells.

In a typical battery cell charging circuit, each battery cell generally has the same capacity and the battery cells are connected in parallel in close proximity forming a battery pack. By positioning the battery cells in close proximity, the difference in impedance between each battery cell and the device which the battery cells power is negligible. As such, the battery cells in a battery pack may charge and discharge at substantially the same rate. However, over the life of the battery pack the battery cells may degrade at different rates and the battery pack will only charge up to the level of the weakest battery cell. Additionally, the battery pack may cease outputting power when one battery cell discharges to a defined discharge limit, even if other battery cells in the battery pack still have capacity left. Moreover, the battery pack may fail when one of the battery cells fails as the cell protection circuit for the battery pack may prevent charging and/or the failed battery cell may short circuit the battery pack.

Battery packs also tend to be large and heavy, which make them difficult to incorporate into a wearable device. In this regard, wearable devices are generally small, light devices with not a lot of internal space for large battery packs. In order to incorporate a large battery pack into a wearable device, the size of the wearable device may need to be increased. For example, the size and weight of a smart watch may need to be increased to fit a larger battery for extended battery life, which may make the smart watch too large and heavy for certain users. A battery pack may also cause uneven weight distribution across a wearable device. For instance, the weight of a wearable device may be heavier at a portion where a battery pack is located compared to the other portions of the wearable device, which can cause discomfort to the user.

As used herein the term wearable device refers to electronic devices capable of being worn by a user, such as smart watches, smart glasses, fitness trackers, health monitors, smart fashion, such as hats, shirts, pants, jackets, and other pieces of clothing, etc.

Example Systems

Figure 1:
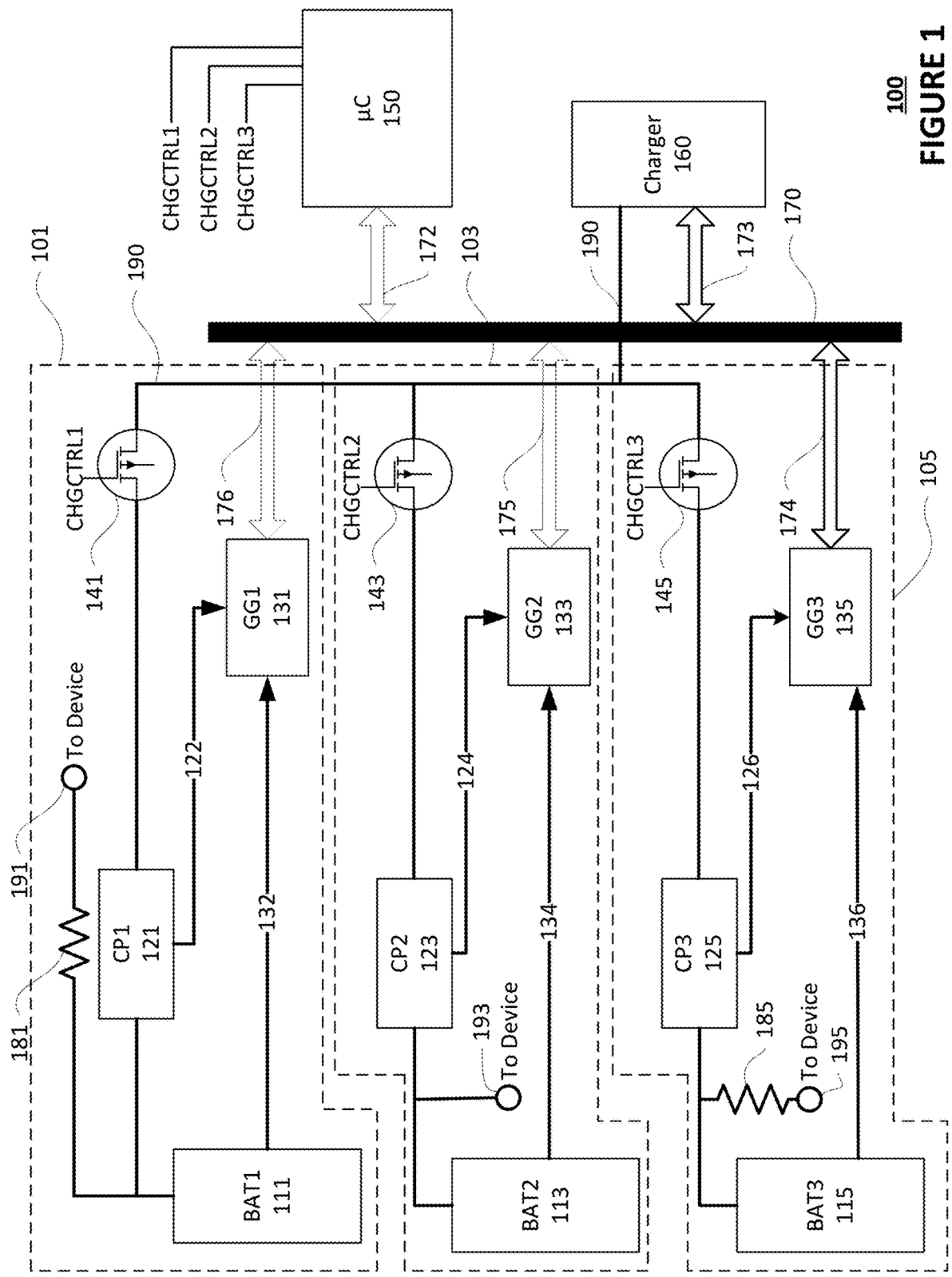
FIG. 1 is an illustration of a distributed battery cell charging circuit according to aspects of the disclosure.

FIG. 1 shows a distributed battery cell charging circuit 100. It should not be considered limiting the scope of the disclosure of usefulness of the features described herein. The distributed battery cell charging circuit 100 includes charging circuits 101-105 for each of the battery cells, shown in dashed lines. For instance, battery cell BAT1 (111) is within charging circuit 101, battery cell BAT2 (113) is within charging circuit 103, and battery cell BATS (115) is within charging circuit 105. Although FIG. 1 only illustrates three battery cell charging circuits, a distributed battery cell charging circuit may include any number of battery charging circuits, each having some or all of the components described herein with relation to charging circuits 101-105. The battery cells may be charged by a charger 160 and charging may be controlled by a centralized controller 150. Although not shown, the battery cells 111-115, charger 160, and other components may be grounded.

As further illustrated in FIG. 1, each charging circuit includes a cell protection circuit, gas gauge, and power switch. Referring to charging circuit 101 cell protection circuit CP1 (121) is positioned between power switch 141 and BAT1 (111). Gas gauge GG1 (131) is connected to CP (121) and battery BAT1 (111). Similarly, in charging circuit 103 cell protection circuit CP2 (123) is positioned between power switch 143 and BAT2 (113) and gas gauge GG2 (133) is connected to CP2 (123) and BAT2 (113). In charging circuit 105, cell protection circuit CP3 (125) is positioned between power switch 145 and BAT3 (115) and gas gauge GG3 (135) is connected to CP3 (125) and BAT3 (115).

The cell protection circuits 121-125 may protect battery cells 111-115, respectively, from potentially harmful operating conditions. In this regard, a cell protection circuit may monitor operating parameters of a battery cell such as the voltage and/or current across a battery cell and disconnect the battery cell from the charging circuit upon detecting a potentially harmful operating condition. Potentially harmful operating conditions may include the voltage of a battery cell exceeding a high-voltage cut-off value, the voltage of a battery cell falling below a low-voltage cut-off value, or the current of a battery cell exceeding a high-current cut-off value.

For example, CP1 (121) may monitor the operating parameters of BAT1 (111). The cell protection circuit CP1 (121) may temporarily or permanently disconnect the battery cell BAT1 (111) from charging circuit 101 when the battery cell BAT1 (111) exceeds a high-voltage cut-off value, the voltage of the battery cell BAT1 (111) falls below a low-voltage cut-off value, and/or the current of the battery cell BAT1 (111) exceeds a high-current cut-off value. The cell protection circuits may disconnect the battery cells using switches, fuses, or other such components capable of disconnecting an electronic component from a circuit.

The gas gauges 131-15 may monitor the operating temperature of the batteries. In this regard, each gas gauge 131-135 may be connected to a battery via a temperature communication line. For example, and as further shown in FIG. 1, GG1 (131) is connected to BAT1 (111) via temperature communication line 132, GG2 (133) is connected to BAT2 (113) via temperature communication line 134, and GG3 (135) is connected to BAT3 (115) via temperature communication line 136.

Each gas gauge may receive temperature data of a given battery via the temperature communication lines. For example, GG1 (131) may receive, or otherwise detect, the temperature of battery cell BAT1 (111) via temperature communication line 132. Based on the temperature of the battery cell BAT1 (111), GG1 (131) may determine the remaining capacity of the BAT1 (111). Similarly, gas gauges GG2 (133) and GG3 (135) may receive, or otherwise detect, the temperature of battery cells BAT2 (113) and BAT3 (115), respectively. Based on the temperatures of BAT2 (113) and BAT3 (115), gas gauges GG2 (133) and GG3 (135) may determine the remaining capacity of BAT2 (113) and BAT3 (115), respectively.

In some instances, the gas gauges may receive the other operating parameters measured by the cell protection circuits 121-125. As shown in FIG. 1, each gas gauge is connected to a cell protection circuit, with GG1 (131) connected to CP1 (121) via data line 122, GG2 (133) connected to CP2 (123) via data line 124, and GG3 (135) connected to CP3 (125) via data line 126. The cell protection circuits 121-125 may transmit or otherwise provide the operating parameters of the battery cells 111-115 to the gas gauges 121-125 via the data lines 122-126.

Although FIG. 1 shows the data lines 122-126 as providing a one way line of communication going in a single direction from the cell protection circuits 121-125 to the gas gauges 131-135, respectively, the data lines 122-126 may be bi-directional allowing two-way communication between the cell protection circuits and gas gauges. In such instances, the gas gauges 131-135 may query the cell protection circuits for operating parameters and/or provide data or controls to the cell protection circuits 121-125. For instance, GG1 (131) may query CP1 (121) for operating parameters of BAT1 (111).

Each charging circuit may be powered by a charger 160, as shown in FIG. 1. The charger may be any charger capable of providing power to the battery cells in each charging circuit. Although FIG. 1 includes a single charger 160, any number of chargers may be included in a distributed battery cell charging circuit.

Each charging circuit may include a power switch to control the flow of power through the charging circuit. A power switch may be a transistor, relay, or other such device capable of electronically opening and/or closing the charging circuit. For example, and as shown in FIG. 1, charging circuit 101 includes a power switch 141, illustrated as a transistor. The power switch 141 receives power from a charger 160 via power line 190. When the power switch 141 closes the charging circuit 101, the power delivered from the charger 160 passes through cell protection circuit 121, and into battery BAT1 (111) for charging. Power switches 143 and 145, which are also illustrated as transistors, may operate similarly to power switch 141. Power switches 143, 145 may each receive power from the charger via power line 190. When power switch 143 closes, power may be delivered to BAT2 (113) and when power switch 145 closes, power may be delivered to BAT3 (115).

The centralized controller 150 may be an ASIC, microcontroller, microprocessor, processor, or other such processing devices, or any combination of processing devices. In some instances, more than one centralized controller may be used to control a discrete battery cell charging circuit. As further shown in FIG. 1, the centralized controller 150 connects to each power switch 141-145 via charge control lines, with charge control line 1, labeled CHGCTRL1 in FIG. 1, being connected to power switch 141, charge control line 2, labeled CHGCTRL2, being connected to power switch 143, and charge control line 3, labeled CHGCTRL3, being connected to power switch 145.

The centralized controller 150 may control each power switch independently through the charge control lines. In this regard, the centralized controller 150 may provide control signals and/or instructions to the power switches which cause the power switches to open or close. For example, the centralized controller 150 may provide a signal to the power switch 145 via charge control line 3—CHGCTRL3, to cause power switch 145 to close, thereby enabling battery cell BAT3 115 to charge. The centralized controller may cease providing the continual or intermittent signal to the power switch 145 to cause the power switch to open, preventing the flow of power to battery cell BAT3 115. In some instances, the centralized controller 150 may send an instruction, such as a digital or analog on/off signal that instructs the receiving power switch to open or close.

The centralized controller 150 may be programmed to send the control signals to the power switches based on data received from the individual charging circuits 101-105 and charger 160. The components may be connected to and communicate the data to the centralized controller 150 over a data bus 170 as shown in FIG. 1. GG1 (131) is connected to the data bus 170 via connection 176, GG2 (133) is connected via connection 175, GG3 (135) is connected via connection 176. Centralized controller is connected to the data bus 170 via connection 172 and charger 160 is connected via connection 173. Although each connection 172-176 is illustrated as a single connection, each connection may include a plurality of connections.

Data bus 170 may be any device capable of enabling the components to communicate with other components in the discrete battery cell charging circuit. In this regard, the data bus may be a serial interface, a digital interface, a parallel interface, or networking interface such as Ethernet, Wi-Fi, Bluetooth, LTE, 3G, 4G, Edge, etc., and various combinations of the foregoing. In one example the data bus may be a serial interface using the I2C protocol.

The data received by the centralized controller may include any data generated, monitored, or otherwise received by the components of the discrete battery cell charging circuit. For example, gas gauge GG1 (131) may transmit data such as the temperature of BAT1 (111), the determined capacity of BAT1 (111), and/or the operating parameters of BAT1 (111) as provided by cell protection circuit CP1 (121) to the centralized controller 150 via connection 176. The charger 160 may also provide data to the centralized controller 150 such as the status of the charger, including whether the charger 160 is operational, the voltage and current being output by the charger, and other such data.

Based on the data received from the gas gauges 131-135, and in some instances the charger 160, the centralized controller 150 may determine whether to send instructions to the power switches 141-145 to open and/or close. For instance, the centralized controller 150 may receive data indicating the remaining capacity of BAT1 (111) in charging circuit 101 is below a threshold value. In response, the centralized controller may send a signal to power switch 141 via charge control line 1 (CHGCTRL1) that cause the power switch 141 to close, thereby providing BAT1 (111) with power from the charger 160. Upon the centralized controller 150 receiving data indicating the battery cell BAT1 (111) is full, or near full, the centralized controller 150 may send a signal to power switch 141 to open, thereby stopping the charging of the battery cell in charging circuit 101. The centralized controller may make similar determination for charging circuits 103 and 105. For instance, when BAT2 (113) has a capacity below a threshold value, the centralized controller may send a signal to power switch 143 via charge control line 2 (CHGCTRL2) to close.

In the event the data received by the centralized controller 150 from the charger 160 indicates an issue with the charger, such as lack of sufficient power being supplied, too much power being supplied, incorrect voltage or current being supplied, the centralized controller may send signals to all power switches that causes them to open to avoid damaging the battery cells in the charging circuits.

Resistors may be used to maintain similar impedance at each battery in the charging circuits. The battery cells 111-115 may be positioned in different locations. As described herein, battery cells positioned in close proximity typically have similar impedances between the battery cells and the device which the battery cells are to power. As such, the battery cells may charge and discharge at substantially the same rate. In the distributed battery cell charging circuit 100 the battery cells may be located apart from one another. Accordingly, the impedances between each battery cell and the device which the battery cells are to power may be different, such as because of differences in wire length required to connect the battery cells to the device. For example, charging circuit 101 may have a smaller distance between battery cell BAT1 (111) and the device than battery cell BAT2 (113) and the device. Accordingly, the impedance between BAT2 (113) and the device may be greater than the impedance between BAT1 (111) and the device.

By positioning resistor 181 in charging circuit 101 between BAT1 (111) and charger 160, the impedance between BAT1 (111) and the device, which connects to connector 191, may be raised to match the impedance between BAT2 (113) and the device. Accordingly, BAT1 (111) and BAT2 (113) may charge and discharge at substantially the same rate. As further shown in FIG. 1, a resistor 185 is also placed in between BAT 3 (115) and the device, which connects to connector 195, such that impedance substantially matches the impedance between BAT2 (113) and the device. Connectors 191, 193, and 195 may be the same connectors and/or connect to the same wire as to which the device to be powered is connected. In this regard, the battery cells are connected in parallel.

The values of the resistors may be set or variable. In this regard, when the location of each battery cell is known, the impedances may be determined and the value of the resistors may be selected to assure all battery cells have the same impedance. In some instances, where the distance between the battery cells and the device are unknown, a variable resistor may be used to account for changes in impedance. In some instances, more than one resistor may be used.

Figure 2:
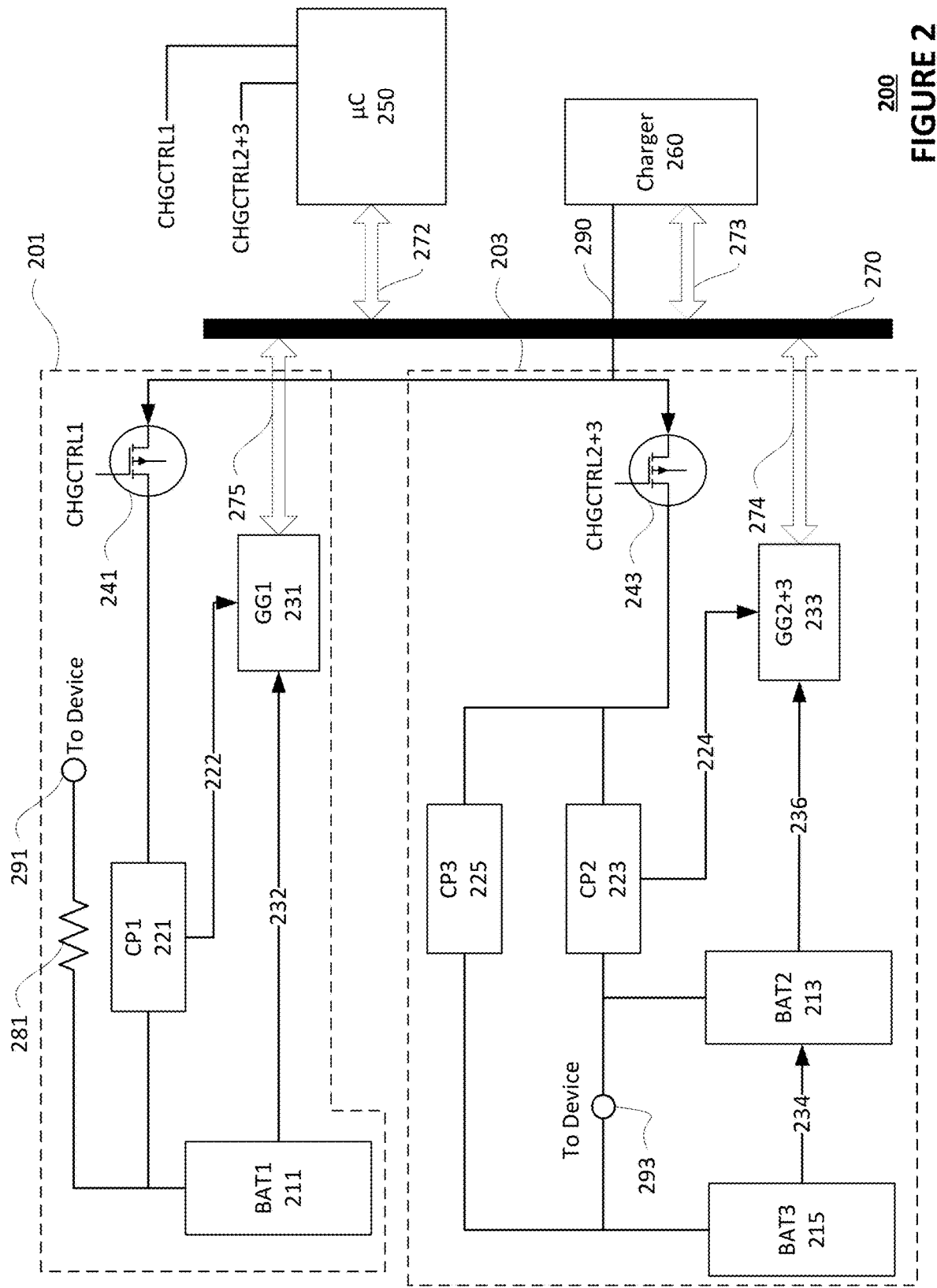
FIG. 2 is an illustration of a distributed battery cell charging circuit having a combined charge control according to aspects of the disclosure.

FIG. 2 shows another distributed battery cell charging circuit 200 having a charging circuit 203 with more than one battery cell, BAT2 (213) and BATS (215), and a charging circuit 201 with a single battery cell BAT1 (211). Charge circuit 201 is similar to charge circuits 101-105, with a single cell protection circuit CP1 (221) and a single gas gauge GG1 (231). Cell protection circuit CP1 (221) may monitor the operating parameters of battery cell BAT1 (211), and in some instances, provide the operating parameters to gas gauge GG1 (231) via data line 222. The gas gauge GG1 (231) may monitor the temperature of battery cell BAT1 (211) via temperature communication line 232. A power switch 241 may receive power from charger 260 via power line 290. The power switch may be controlled by the centralized controller 250 via charge control line 1 (CHHGCTRL1). A resistor 281 may be included to bring the impedance between BAT1 (211) and the device, which connects to connector 291, to the same impedance as battery cells BAT2 (213) and BAT3 (215) and the device, which connects to connector 293. The foregoing example placements of the placement of the resistors are for illustration and may be located elsewhere and on any circuit to bring impedance between the battery cells and the device into equivalence.

Charge circuit 203 includes cell protection circuits CP2 (223) and CP3 (225) for battery cells BAT2 (213) and BAT3 (215), respectively. A single gas gauge GG2+3 (233) may receive temperature data from BAT2 (213) and BAT3 (215) via temperature communication line 236. As illustrated in FIG. 2, BAT 3 (215) passes temperature data to BAT2 (213) via temperature communication line 234. BAT2 (213) then passes the temperature data received from BAT3 (215) and/or the temperature of BAT2 (213) to the gas gauge GG2+3 (233) via temperature communication line 236. In some instances, a gas gauge can include multiple temperature communication line inputs to receive temperature data directly from each battery cell. In other words, each battery cell would directly communicate with the gas gauge via its own dedicated temperature communication lines.

The gas gauge GG2+3 (233) may receive operating parameters from the cell protection circuits CP2 (223) via data line 224. Although only a single data line 224 is shown in FIG. 2, any number of data lines may be present, such as a second data line between cell protection circuit CP3 (225) and GG2+3 (233).

Power switch 243 may receive power from charger 260 via power line 290. The power switch may be controlled by the centralized controller 250 via charge control line 2 and 3 (CHGCTRL2+3). The power switch 243 may control the charging of BAT2 (213) and BAT3 (215). In this regard, the centralized controller 250 may control the charging of two battery cells in the same charging circuit via a single control line and power switch. In some instances, the centralized controller may control more than two battery cells in the same charging circuit via a single control line and power switch.

The centralized controller 250 may be connected to and communicate with the charger 260, GG1 (231) and GG2+3 (233) over data bus 270 as shown in FIG. 1. GG1 (231) is connected to the data bus 270 via connection 275, GG2+3 (233) is connected via connection 274, centralized controller 250 is connected via connection 272 and charger 260 is connected via connection 273. As described herein, the centralized controller can use the date received via the data bus 270 to control charging of the battery cells in the charging circuits.

Although FIG. 2 illustrates two charging circuits 201 and 203, any number of charging circuits including any number of battery cells may be included in a distributed battery cell charging circuit. For instance, an additional charging circuit having two, three, or more battery cells may be included. Moreover, each charging circuit may be removably attached to the distributed battery cell charging circuit. As such, additional circuits may be added or removed as needed.

FIG. 3 shows a single battery pack 303 integrated into a smart shirt wearable device 301. As illustrated by arrow 307, the single battery pack 303 may cause a large downward force on the smart shirt 301 only at the location where the battery pack 303 is located, which may make it uncomfortable to wear. By implementing a battery having a distributed battery cell charging circuit, as shown in smart shirt 321, the battery pack may be split into multiple parts, including batteries 323 and 325. Accordingly, the amount of downward force, illustrated by arrows 327 and 329, may be split and spread across the smart shirt 321, making it more comfortable to wear. Batteries 323 and 325 are for illustration only and a distributed battery cell charging circuit can include any number of batteries.

FIG. 4 shows a single battery pack 403 integrated into a pair of smart glasses 401. As illustrated by arrow 407, the single battery pack 403 may cause a large downward force on a single arm of the pair of smart glasses 401, which may result in the smart glasses being uncomfortable or unevenly distributed across a wearer's face. By implementing a battery having a distributed battery cell charging circuit, as shown in smart glasses 411, the battery pack may be split into multiple parts, including batteries 423 and 425. Accordingly, the amount of downward force, illustrated by arrows 427 and 429, may be split and spread across the smart glasses, making it more comfortable to wear and less susceptible to uneven wear on a wearer's face. Moreover, the amount of space taken in each arm is reduced, which may allow for the size of the arms to be reduced.

Although the technology is described herein in relation to wearable devices, the technology may be implemented in other electronic devices that would benefit from a distribution of batteries and the benefits they offer.

The above features provide for a charging circuit where each battery cell can have different capacities and can be positioned in locations apart from each other battery. Moreover, the features provide for a battery cell charging circuit that allows batteries to be charged and discharged independently of other battery cells, thereby allowing each battery cell to use its full capacity. In addition, the distributed charging circuit allows for smaller batteries to more easily integrate into wearable devices.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A distributed battery cell charging circuit comprising:
a first charging circuit including a first battery cell;
a second charging circuit including a second battery cell, the second battery cell being different than the first battery cell; and
a controller configured to:
receive data from each of the first and second charging circuits via a data bus,
transmit, based on the received data, respective one or more control signals to each of the first and second charging circuits, and
control charging of the first battery cell independently of controlling charging of the second battery cell.

2. The distributed battery cell charging circuit of claim 1 further comprising:
a first power switch in the first charging circuit; and
a second power switch in the second charging circuit.

3. The distributed battery cell charging circuit of claim 2, wherein the controller is connected to the first power switch via a first charge control line and the second power switch via a second charge control line.

4. The distributed battery cell charging circuit of claim 3, wherein the controller controls the charging of the first battery cell by sending the one or more control signals to the first power switch via the first charge control line, the one or more control signals configured to cause the first power switch to open or close the first charging circuit.

5. The distributed battery cell charging circuit of claim 4 further comprising, a charger connected to the first charging circuit via the first power switch and the second charging circuit via the second power switch.

6. The distributed battery cell charging circuit of claim 5, wherein when the one or more control signals cause the first power switch to close, the charger delivers power to the first battery cell.

7. The distributed battery cell charging circuit of claim 5, wherein when the one or more control signals cause the first power switch to open, the charger ceases to deliver power to the first battery cell.

8. The distributed battery cell charging circuit of claim 1 further comprising:
a first cell protection circuit connected to the first battery cell; and
a gas gauge connected to the first cell protection circuit and the first battery cell.

9. The distributed battery cell charging circuit of claim 8, wherein the first cell protection circuit monitors operating parameters of the first battery cell including voltage and current at the first battery cell.

10. The distributed battery cell charging circuit of claim 9, wherein the first cell protection circuit opens the first charging circuit upon detecting voltage over a first threshold value, a voltage below a second threshold value, or a current over a third threshold value to prevent power delivery to the first battery cell.

11. The distributed battery cell charging circuit of claim 9, wherein the gas gauge is configured to determine a capacity of the first battery cell based on a temperature of the first battery cell.

12. The distributed battery cell charging circuit of claim 11, wherein the gas gauge is configured to receive the operating parameters from the first cell protection circuit.

13. The distributed battery cell charging circuit of claim 12, wherein the gas gauge is connected to the controller via the data bus, and the gas gauge is further configured to transmit at least one of the temperature, capacity, and operating parameters of the first battery cell to the controller via the data bus.

14. The distributed battery cell charging circuit of claim 13, wherein the controller is configured to determine whether the capacity of the first battery cell is below a threshold value.

15. The distributed battery cell charging circuit of claim 14, wherein the controller is configured to send an instruction to the first charging circuit to begin charging upon determining the capacity of the first battery cell is below the threshold value.

16. The distributed battery cell charging circuit of claim 1, wherein at least one of the first charging circuit and second charging circuit are removable from the distributed battery cell charging circuit.

17. The distributed battery cell charging circuit of claim 1, wherein the second charging circuit includes at least one additional battery cell.

18. The distributed battery cell charging circuit of claim 1, wherein the first charging circuit includes a resistor to increase an impedance of the first charging circuit.

19. The distributed battery cell charging circuit of claim 18, wherein a resistance value of the resistor increases the impedance of the first charging circuit such that the impedance of the first charging circuit is the same as an impedance of the second charging circuit.

20. The distributed battery cell charging circuit of claim 1 further comprising a third charging circuit.

* * * * *